United States Patent Office 3,131,143
Patented Apr. 28, 1964

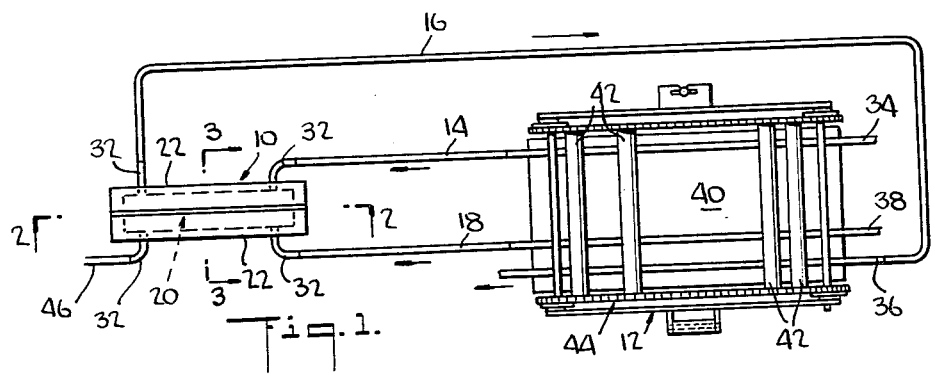
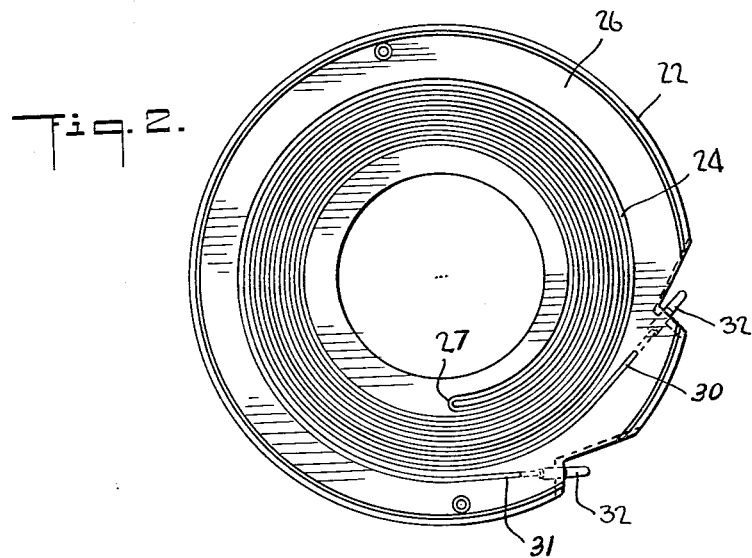
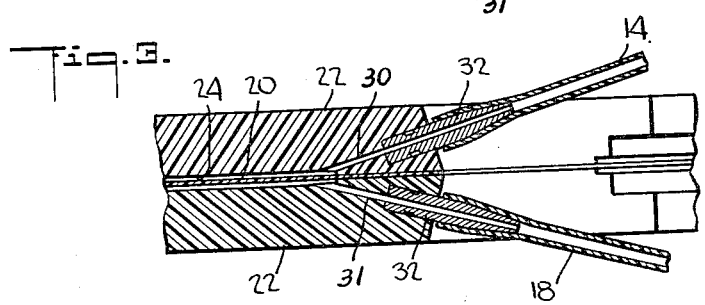

3,131,143
ULTRA-FILTRATION APPARATUS AND METHOD
Andrés Ferrari, Scarsdale, N.Y., assignor to Technicon Instruments Corporation, Chauncey, N.Y., a corporation of New York
Filed Nov. 17, 1959, Ser. No. 853,488
14 Claims. (Cl. 210—22)

This invention relates to ultrafiltration systems and apparatus.

One object of the invention is the provision of an ultrafiltration method and apparatus according to which the rate of ultrafiltration can be effectively varied or controlled without requiring the use of membranes of different pore sizes for the different rates of filtration, respectively.

Another object is to provide an ultrafiltration method and apparatus according to which the ultrafiltration process is performed continuously and with simultaneous passage of a substance from a liquid stream flowing at one side of the filter membrane through the pores thereof into a liquid stream flowing at the other side of said filter membrane.

A further object is to provide an ultrafiltration method and apparatus in which filtration can be performed continuously by the use of a simple and readily available apparatus.

The above and other objects, features and advantages of the invention will be fully understood from the following description considered in connection with the accompanying illustrative drawings, in which:

FIG. 1 is a more or less diagrammatic view of the ultrafiltration apparatus of the invention and is also illustrative of the method of this invention;

FIG. 2 is a plan view, on a larger scale, of the inner side of a part of the apparatus taken on the line 2—2 of FIG. 1; and FIG. 3 is a sectional view on an enlarged scale on the line 3—3 of FIG. 1.

Referring now to the drawings in detail, the ultrafiltration apparatus according to this invention comprises the filter 10 and a proportioning pump 12 which is connected to said filter by the tubing or conduits 14 and 16 and by the tubing or conduit 18.

The filter 10 comprises a semi-permeable membrane 20 positioned between a pair of grooved plates or members 22. Except for the pore size of membrane 20, the filter is preferably of the same construction as the dialyzer shown and described in U.S. Patent No. 2,864,507, issued to the assignee of the present invention. Briefly described, the plates 22 are clamped together with the membrane 20 therebetween and are preferably formed of material sold under the trademark "Lucite" or other suitable material and each is provided with a spiral groove 24 in its inner face 26. Said groove is reflexed at or about midway of its length, as indicated at 28 (FIG. 2), so that the inlet and outlet ends 30 and 31, respectively, of the groove are positioned near each other adjacent the outer periphery of the plate. Nipples 32 are secured in each plate at the ends of the grooves for the connection of tubing for the flow of fluids to and from grooves 24. In FIG. 1, nipples 32 of each plate are shown spaced a considerable distance from each other, as this view is partly diagrammatic and said shown spacing of the nipples facilitates the illustration. However, in the actual construction illustrated by FIGS. 2 and 3, said nipples of each plate are preferably positioned near each other.

It will be understood that the groove 24 of one of the companion plates 22 registers with the groove 24 in the other of said plates but is separated therefrom by the membrane 20 so that a substance in a fluid flowing in groove 24 at one side of the membrane 20 can be filtered from said fluid only by passing through the pores of the membrane into the fluid which flows in the groove at the other side of the membrane.

In accordance with the present invention, the semipermeable membrane 20, which is constituted by a sheet of plain cellophane, i.e., pure regenerated cellulose, has a pore size which is considerably larger than the pore size of the usual membrane of a dialyzer. For example, the usual dialyzer membrane has a pore size of about 40 to 60 Angstrom units while the pore size of the filter membrane 20 is of the order of 5,000 to 10,000 Angstrom units. The provision of a membrane with the larger pores enables more of the substance which is to be separated from a fluid in which it is contained to diffuse through the membrane without requiring the use of excessive fluid pressure. This is an important advantage especially in performing analysis of liquids with respect to substances which are present therein in minute quantities, for example but without limitation in the analysis of boiler waters of steam power plants with respect to chlorides which are present only in very minute amounts, i.e., a few parts of chlorides in a billion parts of the boiler water. In the case of analysis of such liquid in a system based upon dialysis, as referred in the above-mentioned patent, for example, the quantity of the substance which might diffuse through a dialyzer membrane would not be sufficient to provide a satisfactory degree of sensitivity of the analysis process.

Referring now more particularly to the pump 12 and its relation to the filter 10, in the apparatus and method of the present invention, said pump is preferably of the type described in U.S. Patent No. 2,893,324, issued to the assignee of this invention. Briefly described, said pump comprises a plurality of resiliently compressible tubes 34, 36 and 38 of selected internal diameters but of the same wall thickness. In the operation of the pump said tubes are compressed simultaneously progressively along their lengths, against a platen 40 by a series of pressure rollers 42 which are carried by an endless conveyor 44 actuated by a motor not shown to cause the fluid flow in the direction of the arrows in FIG. 1. It will be understood that the rates of flow through the tubular passages 14, 16 and 18 and through the outlet 46 of the filter 10 can be predetermined by the provision of pump tubes of selected internal diameters without varying the speed of movement of pressure rollers 42 longitudinally of said tubes.

Provision is made in the method and apparatus of the present invention for controlling the rate of filtration. For this purpose the tubing 34 and 14 by which the fluid which is to be subjected to ultrafiltration is supplied to filter 10 has a larger internal diameter than the tubing 16 and 36 by which the fluid is conducted from the filter. Simultaneously with the flow of the liquid through tubing 14 to the filter and through groove 24 at one side of the membrane 20, a stream of liquid is transmitted by tubing 38 and 18 to the filter for passage through the groove 24 at the other side of the membrane and out of the filter 10 through its outlet 46. In the course of the flow of the liquids through the filter at opposite sides of membrane 20, a quantity of the substance which is contained in the liquid supplied by tubing 14 and which is to be separated from said liquid passes through the porous membrane 20 into the stream of liquid which flows through the filter at the other side of the membrane. This last mentioned stream is discharged through the outlet 46 and is transmitted for further treatment or analysis in a continuous automatic analysis system which is preferably of the type described in U.S. Patent No. 2,797,149, assigned to the assignee of the present invention. It is obvious that any ingredients in the first metioned stream which are too large to pass through the pores of the membrane are prevented by the membrane from entering the last mentioned liquid stream which is discharged through outlet 46 for analysis.

It will be understood that the difference in the flow rates through tubing 14 and 16 represents the rate of filtration of the substance through the membrane 20 as described above. For example, if the sample liquid, under analysis, is transmitted through tubing 14 at the rate of 5 ml. per minute and the filtered liquid flows through at the rate of 1.2 ml. per minute, there is transmission through the membrane at the rate of 3.8 ml. per minute. The liquid which is transmitted to the filter by tubing 38 and 18 is preferably a reagent for the quantitative colorimetric examination or analysis of the substance which passes into said reagent from the stream of liquid supplied to the filter by tubing 34 and 14. The rate of flow of the reagent may be varied without affecting the rate of filtration of the substance through the membrane and into the reagent, but in the case of the stated rate of filtration, the flow rate of the reagent is 2.4 ml. per minute. These rates of flow are those provided, for example, in the quantitative analysis of boiler waters in respect to their chlorides content by well known or suitable method but performed preferably by the automatic analysis apparatus of the type described in the above-mentioned Patent No. 2,797,149. It will be understood, however, that the present invention is not concerned with or limited to a specific analysis, either as to the chemistry thereof or the substance in respect to which the analysis is performed but, on the contrary, is generally applicable for the purpose of ultrafiltration to various processes where ultrafiltration is required or desirable. However, as an illustrative example, of the application of this invention to the treatment of boiler waters for the colorimetric analysis thereof in respect to chlorides, the determination is based upon formation of the ferric-thyocyanate complex, and the water under analysis is mixed with a reactant consisting essentially of freshly pre-mixed stream of 6% ferric alum

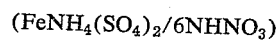

and saturated mercuric thiocyanate by pumping the water and said reactant through tubes 14 and 18, respectively, into the filter 10 at opposite sides of the membrane 20, at the above indicated flow rates. The resulting stream of liquid discharged from the filter outlet 46 is then transmitted to the flow cell of a colorimeter-recorder (not shown) for recording the quantitative determination pursuant to the operation of the recorder under the control of the colorimeter.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:

1. Ultrafiltration apparatus, comprising a filter including semi-permeable filter material and means at opposite sides, respectively, of said filter material forming with said filter material fluid passages at said opposite sides, respectively, of the filter material for the passage of filtrate from the fluid in one of said passages into the other of said passages, pump means for transmitting to said one passage at one rate of flow a stream of the fluid which is to be filtered, means for simultaneously transmitting through the other of said passages a second stream of fluid for the passage of the filtrate into the fluid of said last mentioned stream during the flow of said fluid streams through said passages, and pump means in addition to said filter material coacting with said one passage for effecting the withdrawal of fluid therefrom at a rate of flow which is lower than the rate of flow of fluid into said one passage so that passage of the filtrate through said filter material occurs at a rate of flow which is equal to the difference in said flow rates.

2. Ultrafiltration apparatus comprising a filter including a semi-permeable membrane and means at opposite sides, respectively, of said membrane forming therewith fluid passages at said opposite sides, respectively, of the membrane for the passage of filtrate from the fluid in one of said passages into the other of said passages, pump means for transmitting through said one passage at one rate of flow a stream of the fluid which is to be filtered, means for simultaneously transmitting through the other of said passages a second stream of fluid for the passage of the filtrate into the fluid of said last mentioned stream during the flow of said fluid streams through said passages, and pump means in addition to said membrane coacting with said one passage for effecting the withdrawal of fluid therefrom at a rate of flow which is lower than the rate of flow of fluid into said one passage so that passage of the filtrate through said membrane occurs at a rate of flow which is equal to the difference in said flow rates.

3. Ultrafiltration apparatus, comprising a filter including semi-permeable filter material and means at opposite sides, respectively, of said filter material forming with said filter material fluid passages at said opposite sides, respectively, of the filter material for the passage of filtrate from the fluid in one of said passages into the other of said passages, means for transmitting to said one passage at one rate of a stream of the fluid which is to be filtered, means for simultaneously transmitting through the other of said passages a second stream of fluid for the passage of the filtrate into the fluid of said last mentioned stream during the flow of said fluid streams through said passages, and means in addition to said filter material coacting with said one passage to effect the discharge of fluid therefrom at a rate of flow which is lower than the rate of flow of fluid into said one passage for the filtering process, said last mentioned means and said means for transmitting to said one of the passages the fluid to be filtered comprising a pump means connected to said one passage at one point to transmit fluid thereto at said one rate of flow and connected to said one passage at another point spaced from said one point to withdraw fluid from said one passage at said lower rate of flow.

4. Ultrafiltration apparatus comprising a filter including a semi-permeable membrane and means at opposite sides, respectively, of said membrane forming therewith fluid passages at said opposite sides, respectively, of the membrane for the passage of filtrate from the fluid in one of said passages into the other of said passages, means for transmitting to said one passage at one rate of flow a stream of the fluid which is to be filtered, means for simultaneously transmitting through the other of said passages a second stream of fluid for the passage of the filtrate into the fluid of said last mentioned stream during the flow of said fluid streams through said passages, and means in addition to said membrane coacting with said one passage to effect the discharge of fluid therefrom at a rate of flow which is lower than the rate of flow of fluid into said one passage for the filtering process, said last mentioned means and said means for transmitting to said one of the passages the fluid to be filtered comprising pump connected to said one passage at one point to transmit fluid thereto at said one rate of flow and connected to said one passage at another point spaced from said one point to withdraw fluid from said one passage at said lower rate of flow.

5. Ultrafiltration apparatus, comprising a filter including semi-permeable filter material and means at opposite sides, respectively, of said filter material forming with said filter material fluid passages at said opposite sides, respectively, of the filter material for the passage of filtrate from the fluid in one of said passages into the other of said passages, pump means for transmitting to said one passage at one rate of flow a stream of the fluid which is to be filtered, means for simultaneously transmitting through the other of said passages a second stream of fluid for the passage of the filtrate into the fluid of said last mentioned stream during the flow of said fluid streams through said passages, and pump means in addition to said filter material to effect the discharge of fluid from said one passage at a rate of flow which is lower than the rate of flow of fluid into said one passage for the filtering process so that passage of the filtrate through said filter material occurs at a rate of flow which is equal to the difference in said flow rates.

6. Ultrafiltration apparatus, comprising a filter including semi-permeable filter material and means at opposite sides, respectively, of said filter material forming with said filter material fluid passages at said opposite sides, respectively, of the filter material for the passage of filtrate from the fluid in one of said passages into the other of said passages, means for transmitting to said one passage at one rate of flow a stream of the fluid which is to be filtered, means for simultaneously transmitting through the other of said passages a second stream of fluid for the passage of the filtrate into the fluid of said last mentioned stream during the flow of said fluid streams through said passages, and means in addition to said filter material to effect the discharge of fluid therefrom at a rate of flow which is lower than the rate of flow of fluid into said one passage for the filtering process, said last mentioned means and said means for transmitting to said one of the passages the fluid to be filtered comprising pump means connected to said one passage at one point to transmit fluid thereto at said one rate of flow and connected to said one passage at another point spaced from said one point to withdraw fluid from said one passage at said lower rate of flow.

7. Ultrafiltration apparatus, comprising a filter including semi-permeable filter material and means at opposite sides, respectively, of said filter material forming with said filter material fluid passages at said opposite sides, respectively, of the filter material for the passage of filtrate from the fluid in one of said passages into the other of said passages, means for transmitting to said one passage at one rate of flow a stream of the fluid which is to be filtered, means for simultaneously transmitting through the other of said passages a second stream of fluid for the passage of the filtrate into the fluid of said last mentioned stream during the flow of said fluid streams through said passages, and means in addition to said filter material to effect the discharge of fluid therefrom at a rate of flow which is lower than the rate of flow of fluid into said one passage for the filtering process, said last mentioned means and said means for transmitting to said one of the passages the fluid to be filtered comprising proportioning pump means connected to said one passage at one point to transmit fluid thereto at said one rate of flow and connected to said one passage at another point spaced from said one point to withdraw fluid from said one passage at said lower rate of flow, so that passage of the filtrate through said filter material occurs at a rate of flow which is equal to the difference in said flow rates.

8. A method of ultrafiltration according to which the filter comprises semi-permeable filter material and means at opposite sides, respectively, of said filter material forming with said filter material fluid passages at said opposite sides, respectively, of the filter material for the passage of filtrate from the fluid in one of said passages into the other of said passages, said method comprising pumping a stream of fluid to be filtered to one of said passages at one rate of flow simultaneously with the transmission to the other of said passages of a second stream of fluid for the passage of filtrate from said first mentioned stream into the fluid of said second stream during the concurrent flow of the two streams of fluid through said passages, and pumping fluid from said one of the passages, after the abstraction of filtrate therefrom, at a rate of flow which is lower than said one rate of flow of the fluid into said one passage for the filtering process so that a rate of filtering is effected which is equal to the difference in the rates of flow of the fluid into and out of said one passage.

9. A method of ultrafiltration according to which the filter comprises semi-permeable filter material and means at opposite sides, respectively, of said filter material forming with said filter material fluid passages at said opposite sides, respectively, of the filter material for the passage of filtrate from the fluid in one of said passages into the other of said passages, said method comprising pumping a stream of fluid to be filtered to one of said passages at one rate of flow simultaneously with the transmission to the other of said passages of a second stream of fluid for the passage of filtrate from said first mentioned stream into the fluid of said second stream during the concurrent flow of the two streams of fluid through said passages, and pumping fluid from said one of the passages, after the abstraction of filtrate therefrom, at a rate of flow which is lower than said one rate of flow of the fluid into said one passage for the filtering process so that a rate of filtering is effected which is equal to the difference in the rates of flow of the fluid into and out of said one passage, said second stream of fluid comprising a reagent for the treatment of said filtrate for quantitative analysis of said first mentioned fluid in respect to said filtrate.

10. A method of ultrafiltration according to which the filter comprises semi-permeable filter material and means at opposite sides, respectively, of said filter material forming with said filter material fluid passages at said opposite sides, respectively, of the filter material for the passage of filtrate from the fluid in one of said passages into the other of said passages, said method comprising transmitting a stream of fluid to be filtered to one of said passages simultaneously with the transmission to the other of said passages of a second stream of fluid for the passage of filtrate from said first mentioned stream into the fluid of said second stream during the concurrent flow of the two streams of fluid through said passages, and controlling the rate of passage of said filtrate through said filter material by pumping fluid into and out of said one of the passages at different rates of flow.

11. A method of ultrafiltration according to which the filter comprises semi-permeable filter material and means at opposite sides, respectively, of said filter material forming with said filter material fluid passages at said opposite sides, respectively, of the filter material for the passage of filtrate from the fluid in one of said passages into the other of said passages, said method comprising transmitting a stream of fluid to be filtered to one of said passages simutaneously with the transmission to the other of said passages of a second stream of fluid for the passage of filtrate from said first mentioned stream into the fluid of said second stream during the concurrent flow of the two streams of fluid through said passages, said second stream of fluid comprising a reagent for the treatment of said filtrate for quantitative analysis of said first mentioned fluid in respect to said filtrate, and controlling the rate of passage of said filtrate through said filter material by pumping fluid into and out of said one of the passages at different rates of flow.

12. A method of ultrafiltration according to which the filter comprises semi-permeable filter material and means at opposite sides, respectively, of said filter material forming with said filter material fluid passages at said opposite sides, respectively, of the filter material for the passage of filtrate from the fluid in one of said passages into the other of said passages, said method comprising transmitting a stream of fluid to be filtered to one of said passages simultaneously with the transmission to the other of said passages of a second stream of fluid for the passage of filtrate from said first mentioned stream into the fluid of said second stream during the concurrent flow of the two streams of fluid through said passages, the filter material comprising a semi-permeable membrane, and controlling the rate of passage of said filtrate through said filter material by pumping fluid into and out of said one of the passages at different rates of flow.

13. Ultrafiltration apparatus according to claim 1, wherein the filter material comprises a semi-permeable membrane having a pore size of from about 5,000 Angstrom units to about 10,000 Angstrom units.

14. Ultrafiltration apparatus according to claim 3, wherein the filter material comprises a semi-permeable membrane having a pore size of from about 5,000 Angstrom units to about 10,000 Angstrom units.

References Cited in the file of this patent

UNITED STATES PATENTS

| 2,568,990 | Daniel | Sept. 25, 1951 |
| 2,864,506 | Hiskey | Dec. 16, 1958 |
| 2,864,507 | Isreeli | Dec. 16, 1958 |
| 2,893,324 | Isreeli et al. | July 7, 1959 |
| 2,926,006 | Isreeli | Feb. 23, 1960 |
| 2,935,028 | Ferrari et al. | May 3, 1960 |

OTHER REFERENCES

Weisgerber: "Technique of Organic Chemistry," vol. III, part I, Separation and Purification, second edition (1956), published by Interscience Publishers, N.Y., pp. 711–718 relied upon.